July 19, 1927.

R. A. FESSENDEN 1,636,502

METHOD AND APPARATUS FOR DETERMINING DISTANCE BY ECHO

Filed March 28, 1921     2 Sheets-Sheet 2

WITNESSES:

INVENTOR.

ATTORNEY.

Patented July 19, 1927.

1,636,502

UNITED STATES PATENT OFFICE.

REGINALD A. FESSENDEN, OF CHESTNUT HILL, MASSACHUSETTS.

METHOD AND APPARATUS FOR DETERMINING DISTANCE BY ECHO.

Application filed March 28, 1921. Serial No. 456,112.

My invention relates to methods and apparatus for locating the position of objects by echo and more particularly their distance and direction, and still more particularly for taking soundings from ships and aeroplanes, locating icebergs, mines and derelicts.

My invention has for its object increased efficiency in the art of locating position by echo.

Figure 1:
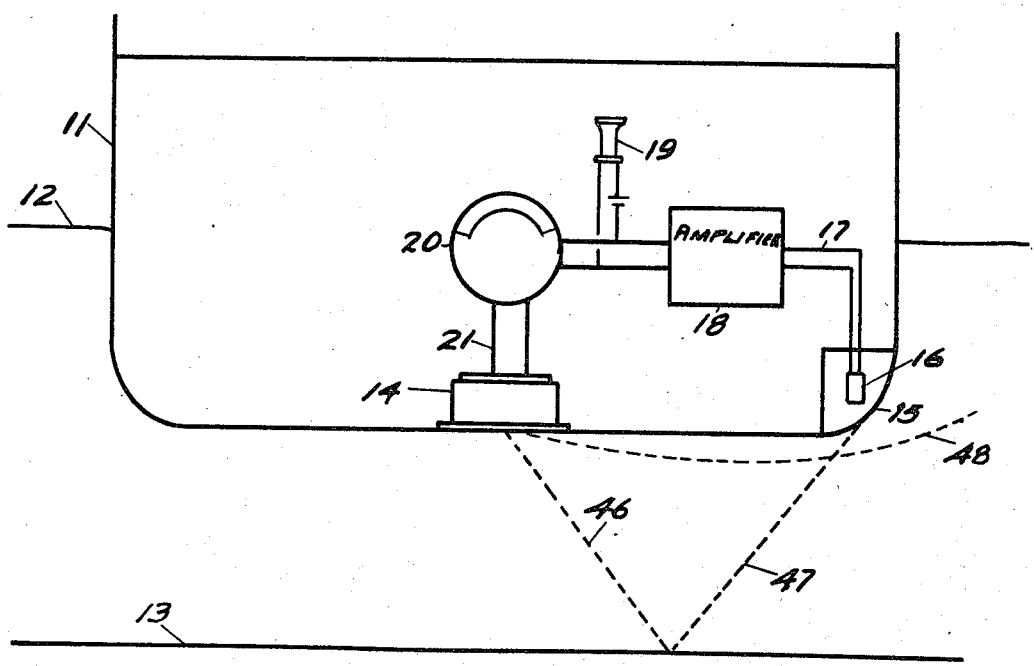
Figure 2:
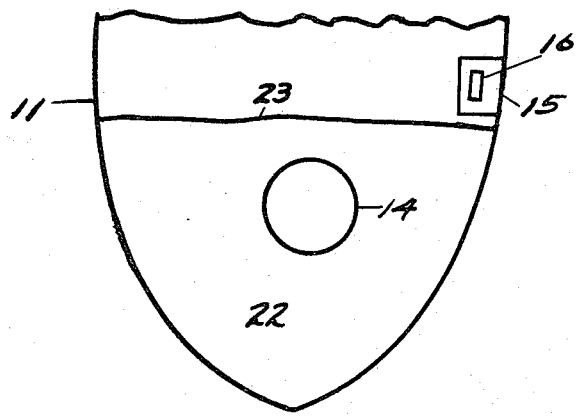
Figure 3:
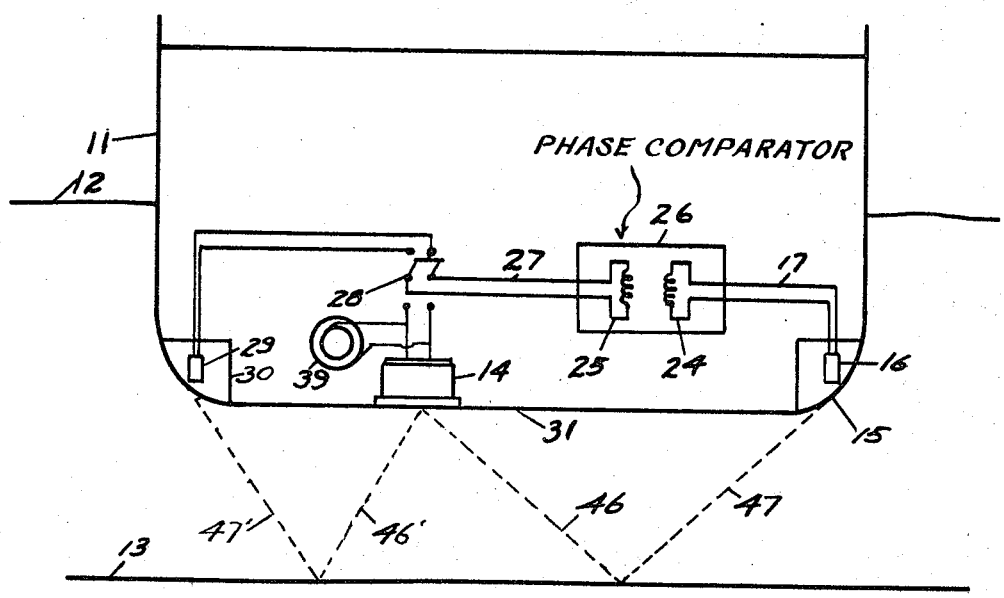

Figures 1 to 3, forming a part of this specification, show partly diagrammatically, arrangements suitable for carrying out my invention.

In the Hydrographic Office Bulletin of May 13th, 1914, will be found the official report by Captain Quinan of the United States revenue cutter *Miami* of the official tests of applicant's method of locating icebergs and making soundings by echo. The apparatus used in these tests was based upon applicant's then recent discovery of the theory of "sound fringes," and as this was the first time that icebergs had ever been located by other than visual means, or soundings taken by other means than weighted line, the apparatus and methods were somewhat crude for routine navigational work, notwithstanding the fact that icebergs were located up to distances of 10 and 12 miles and soundings taken from 37 fathoms to a mile and a half depth. Applicant therefore discloses in the present application improvements in the methods and apparatus previously disclosed and also new methods and apparatus.

In the method shown in Figs. 1 and 2 the echo itself controls the emission of the echo producing sound, or vox, and hence the frequency of the echo is inversely proportional to the time taken by the sound in travelling from the transmitter to the bottom and thence back to the receiver, i. e., varies inversely with the depth of water. It may be called the singing echo method.

In Fig. 1 and Fig. 2, 11 is the ship, 12 is the water line, 13 is the bottom of the sea or channel, 14 a sound producing means, here shown as an oscillator, but which may be of any other suitable means; for example, a spark gap in oil; an electro-magnetized nickel rod; a spark plug in a mixture of two parts hydrogen and one part oxygen gas; an intermittent beam of light or radiant heat in a gas or in water or oil containing lampblack in suspension, or ether containing platinum black in suspension; or a condenser oscillator as described in applicant's U. S. Patent No. 1,182,843, Sept. 3rd, 1913.

The oscillator is preferably located in a fore-peak tank, as shown in Fig. 2. 16 is a sound receiver, here shown as a microphone immersed in the tank 15, but any suitable sound receiver may be used. The receiver 16 is preferably mounted in a different compartment to that containing the sound producer 14, as shown in Fig. 2; and also, as shown in Fig. 1, in the sound shadow produced by the side of the ship, so that sounds directly produced by 14 will, as shown by the dotted line 48, pass by it without affecting it, while it will be affected by the echoes, as shown by the dotted lines 46, 47.

The receiver 16 is operatively connected through the conductors 17 to the amplifier 18, which amplifies the impulses received by the receiver many thousands of times, the amount depending upon the coefficient of absorption of the bottom, the lower the coefficient the greater being the amplification needed. Applicant, by experiments on the Banks of Newfoundland and elsewhere has found that the coefficient may as a rule be taken as about 99%.

In place of an amplifier any other suitable type of circuit controller may be used; for example a Weston relay, see catalog for 1910, Weston Instrument Co. of Newark, N. J. or U. S. Pat. 1,048,670 and Park Benjamin's "The Voltaic Cell," Figs. 4 and 5, or other type of relay.

The amplified currents are led, as shown through the frequency meter, 20, which may be of any of the well known types, and is preferably recording, to the oscillator 14, through the leads 21.

As the rate at which the impulses succeed each other in the oscillator will depend upon the time taken by the sound to travel from 14 to the bottom of the channel and thence back to the receiver 16, i. e. upon the depth of water under the ship, the scale of the frequency meter may be graduated to give the depth in yards or fractions of a yard. For example, if the ship is 80 feet wide, and there is 20 feet of water under her keel, the length of the echo path will be approximately 70 feet, as found by experiment, and since sound travels approximately 4800 feet per second in sea water, the frequency read by the meter will be approximately 60 per second, (owing to the lag of the apparatus 14), and a depth of 20 feet may be marked opposite the frequency 60.

The reason why a path length of 70 feet is found experimentally, though the geometric length is only about 56 feet is not known to applicant. He has found empirically, from working over his observations, that the experimental path length may be got by assuming that the sound wave goes perpendicularly from 14 to the bottom and is reflected from that perpendicular point on the bottom, at an angle, to 16. Applicant has developed a mathematical theory which would give this result, but has not as yet been able to prove it completely experimentally.

In place of the frequency meter an audible signal may be used, for example the telephone receiver 19, shunted across the amplifier leads. The note emitted by this receiver will increase in shrillness and in intensity as the water shoals. Both types, i. e. frequency meter and audible signal, may be used simultaneously, as shown.

In the presence of much extraneous noise, for example where soundings are being taken from an aeroplane to determine its height above ground, applicant's thermophone, i. e. receiver operating by the heating action of electric currents on a minute platinum or palladium wire, as described in the London Electrician of June 24th, 1904, since, as therein described, the whole thermophone is inserted in the ear and extraneous sounds are thereby cut out. In Fig. 1, let us assume that the diaphragm has in some way been set in vibration, and that thereby a sound impulse is sent out by the oscillator 14. This impulse travels to the bottom, is reflected, and operates the receiver 16 a definite time after the impulse has been emitted from the oscillator. The received impulse passes to the amplifier, delayed only by the infinitesimal lag in electrical circuits of this type, and operates the amplifier to send an energy impulse to the oscillator. It must be appreciated that after the initial impulse of energy or jar is given the diaphragm, the electrical energy for operating the oscillator is supplied wholly by the amplifier. The received signal acts merely as a relay in controlling the amplifier to produce the next energy impulse. Accordingly, impulses are set up at a definite rate dependent upon the time necessary for the signal to travel to the object and be reflected back. There is a continuous cycle, the signal which is received sending out the next signal. The frequencies of these impulses therefore will determine the distance to be measured since the number of cycles per second, which is the frequency, is inversely proportional to the interval of time between the impulses. To measure the frequency, a frequency meter is used. It would not seem necessary to go into the details of the frequency machine or meter as such machines are well known in the art, but it may be well to remark that the effect of the successive signals upon the frequency meter is to build up a specific frequency indication which gives a measure of the distance. It will be appreciated of course that the time interval of any one particular cycle gives the measurement of that distance at the time the cycle takes place, but that the particular method and means here employed for indicating this distance is operated by the continual effect of successive impulses. As the frequency changes which of course means as the time of the cycles changes, it follows that the distance which is being measured changes.

Said extraneous noises, however, have a usual function in furnishing the initiatory impulse for starting the periodic oscillations. For example, a slight stamp on the deck of the ship 11 or a ripple against the side of the vessel will give an initial impulse to the receiver 16, the apparatus as shown in Fig. 1 constituting in itself a means which has been found satisfactory in practice, for furnishing the initial impulse, though other means may of course be used, as for example, the connection of the circuit itself or the throwing in of the field of the oscillator, or placing the receiver 19 to the ear, or any act in short which excites the sounder 14 or the receiver 16.

In the method shown in Fig. 3, the depth is determined by noting or comparing the phase of the echoed sound received on one receiver with the phase of the current in some other conductor, or the phase of the sound in some other receiver. In Fig. 3, the elements not already described under Figures 1 and 2 are; 26, a phase comparator of any of the well known types; for example Professor Moore's type, Philosophical Magazine, May 1909, pp. 310 and 312, used in the World War under the name of the Compensator; or applicant's heterodyne phase measurer (U. S. Patent 1,050,728) ; or applicant's commutator phasemeter (U. S. Patent 1,170,969), described in other applications. 24 is a coil attached to the echo receiving receiver 16, and 25 a coil which, when the switch 28 is thrown up, is connected to the receiver 29, immersed in the tank 30. Since, as shown in the figure, the sender 14 is to the left of the centre of the ship and therefore considerably nearer to the receiver 29 than to the receiver 16, the currents produced by the echoes travelling the paths 46', 47', and 46, 47, in the coils 25, 24, will have different phases, depending upon the depth of water, and by measuring the phase difference by the phase comparator 26, the depth can be ascertained.

The phase comparator 26 may be, and is preferably, automatically recording. This comparator may be any one of a number of well known types, for example the Weston comparator the construction and operation of which is well known in the art. If the switch 28 be thrown down, then the coil 25 will be shunted across the dynamo 39 which excites the oscillator 14. In this case the phase of the currents in the coil 25 will be substantially that of the sound emitted by the oscillator 14, while the phase of the currents in the coil 24 will vary, as before, with the depth, for example, if at 5 ft. depth and frequency 60 the sound path length between 14 and 16 is one complete wave length, the currents in 24, 25 will be in phase. If the depth be increased to 10 ft. the sound path will be more than a wave length, and the phase of the current in 24 will lag behind that of the current in 25 by an amount depending on the increase in depth and hence the depth can be determined in this way also, up to a depth equal to half a wave length, by means of the phase comparator 26.

It is evident from an understanding of the above that the invention herein described may be carried out by other means than those shown, as will be readily understood by those skilled in the art.

Heretofore in the practice of the art the depth has been determined by the individual indications produced by single impulses or groups of impulses, each impulse or group producing an indication independently of the other impulses or groups of impulses; and therefore independent of the time elapsing between said impulses or groups of impulses generated by the sound producing device. In applicant's improved method the impulses or groups of impulses are generated periodically and the indication depends upon the period and is an integral effect in that it depends upon a succession of said impulses or groups, following each other at a certain periodicity, and not on the single impulses or groups. Also, in one of the improved types, the periodicity itself depends upon the depth. Applicant's method eliminates the effect of disturbances, and has other advantages.

What I claim is:—

1. In the art of locating objects by reflected waves, means for generating compressional wave impulses; means for receiving compressional wave impulses, transforming them into electrical impulses and impressing them on said first named means, frequency responsive indicating means between the first and second named means and means for producing an initiatory impulse in said first named means.

2. The method of locating objects by reflected waves which consists in sending a compressional wave toward the object to be located, receiving the echo of said wave at the sending station and sending a second wave synchronously with the receipt of the echo of the first, repeating the cycle indefinitely, and measuring the frequency of said cycle in terms of distance.

3. Means for locating objects by reflected waves comprising means for generating compressional wave impulses, means for receiving compressional wave impulses and transforming them into electrical impulses and impressing them upon said first-named means, and frequency responsive indicating means between said second and first named means.

4. The method of determining distances by echo which comprises sending a compressional wave impulse toward the object the distance of which is to be determined, and receiving the echo therefrom in the form of a compressional wave, causing said received wave to send a second compressional wave impulse toward said object, repeating the cycle indefinitely whereby the periodicity of the sending of said wave impulses toward said object will be determined by the periodicity of the receipt of said received impulses, and observing a suitable function of said periodicity.

5. The method of determining distances which consists in sending a compressional wave impulse toward the object, the distance of which is to be determined, and receiving the echo therefrom in the form of a compressional wave and causing said received wave to send a second compressional wave impulse toward said object and repeating the cycle indefinitely whereby the periodicity of the sending of said wave impulses toward said object will be determined by the periodicity of the receipt of said received impulses and measuring the said periodicity of such receipt.

6. The method of determining distance by echo which comprises sending out compressional waves toward the object the distance of which is to be determined and receiving the echo therefrom in the form of compressional waves and causing said received waves to cause the sending of other like waves repeating the cycle indefinitely at a frequency automatically determined by the distance of the object whose distance is to be determined and observing a suitable function of said frequency.

7. The method of determining distances by echo which comprises sending out a compressional wave toward the object the distance of which is to be determined, and receiving the echo therefrom in the form of compressional waves and causing the received wave to cause the sending of a second compressional wave and repeating the cycle indefinitely whereby the frequency of the wave sent out will be a multiple of the distances traveled by the echo and will produce sounds which are a substantially constant multiple of said distances.

8. In the art of locating objects by reflected impulses, the method which comprises sending an impulse towards the object to be located, receiving the echo of said impulse after reflection, sending towards the object to be located a second impulse synchronously with the reception of the echo of the previous impulse and observing a suitable function of the time between said first and said second impulses.

9. In the art of locating objects by reflected impulses, the method which comprises sending an impulse towards the object to be located, receiving the echo of said impulse after reflection, and sending towards the object to be located a second impulse synchronously with the reception of the echo of the previous impulse, repeating the cycle indefinitely and observing a suitable function of the time between the times of sending said first and said second impulses.

10. The method of locating objects by reflected impulses which consists in sending an impulse toward the object to be located, receiving the echo of said impulse after reflection, and sending toward the object to be located a second impulse synchronously with the reception of the echo of the first impulse, repeating the cycle indefinitely, and measuring the time between said synchronized impulses.

REGINALD A. FESSENDEN.